Feb. 4, 1947.    A. G. DEAN    2,415,341
TRAP DOOR AND STEP ARRANGEMENT
Filed Nov. 8, 1943    2 Sheets-Sheet 2
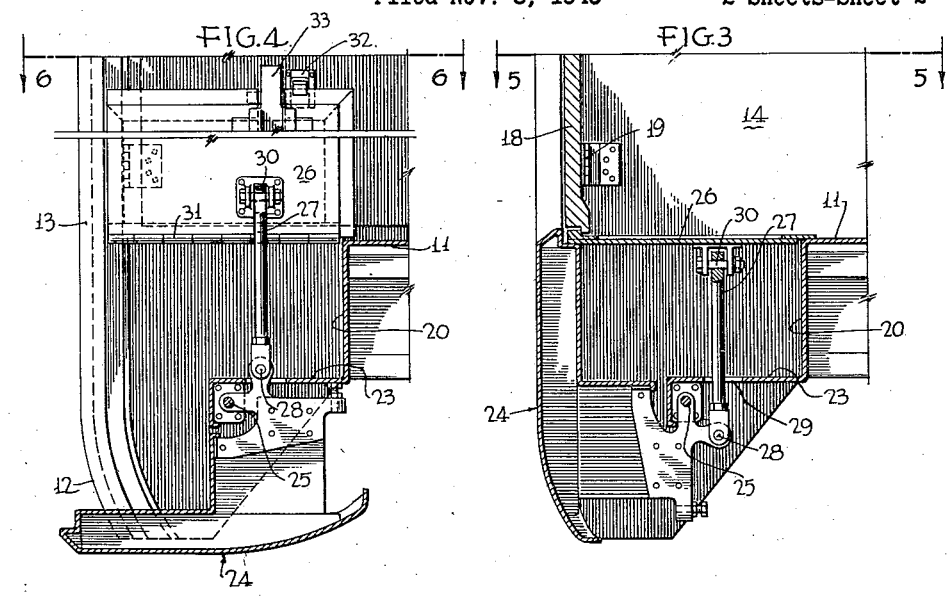
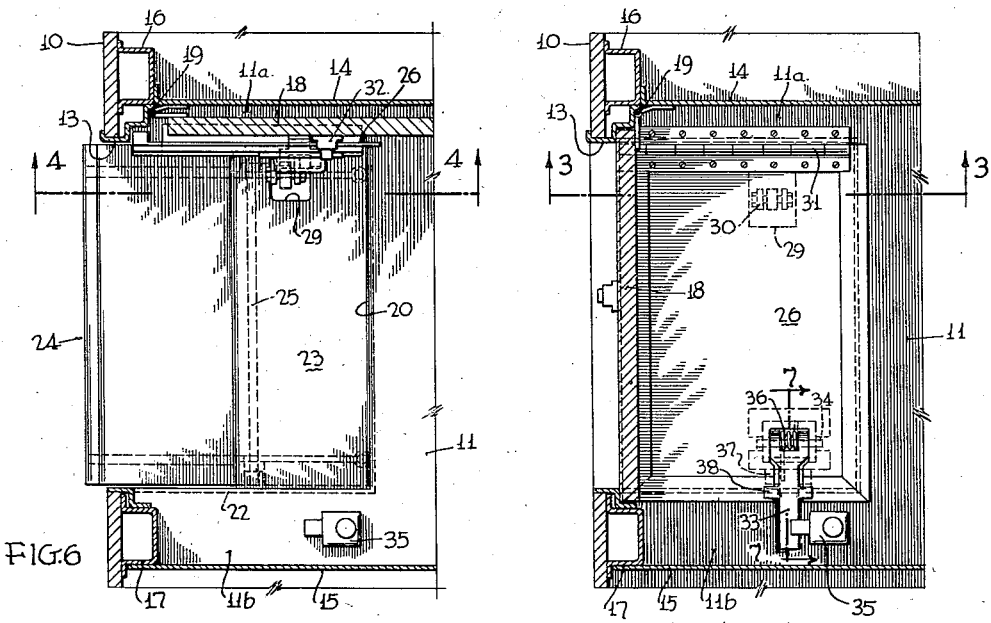
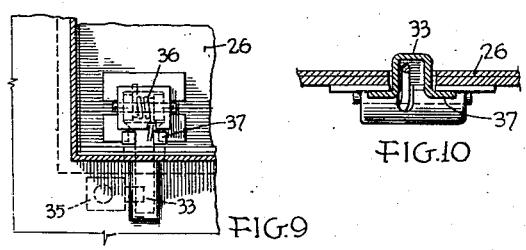
INVENTOR
Albert G. Dean.
BY
John P. Tasby
ATTORNEY Patented Feb. 4, 1947

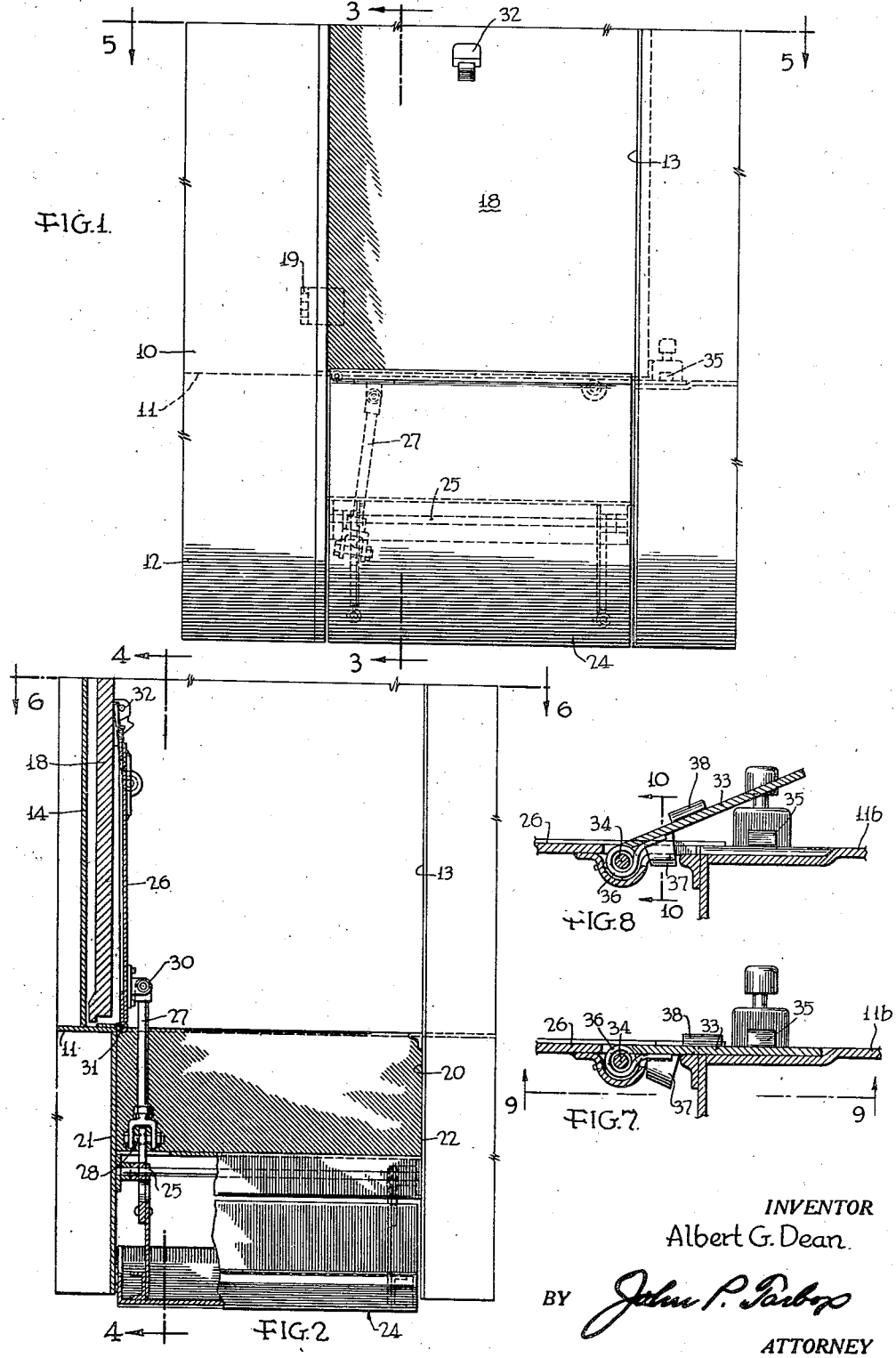

2,415,341

UNITED STATES PATENT OFFICE 2,415,341

TRAP DOOR AND STEP ARRANGEMENT

Albert G. Dean, Narberth, Pa., assignor to The Budd Company, Philadelphia, Pa., a corporation of Pennsylvania Application November 8, 1943, Serial No. 509,401

8 Claims. (Cl. 105—430)

1

The invention relates to rail cars or the like and more particularly to the trap door and step well construction thereof.

Such trap door and step well arrangements, as heretofore provided, have usually included, in addition to the trap door normally closing the step well, a movable step assembly connected with the trap door, whereby the trap door and step well were moved together to open or closed position. Usually the closing movement of the trap door was opposed by a powerful spring or springs sufficient to move the trap door to a partly raised position, when released by the usual latch holding it closed against the action of this spring or springs.

Such spring was required to lift, in some cases, not only the weight of the trap door, but also, where the trap door was connected by an inextensible connection to a movable step assembly, the spring further had to overcome the inertia of said step assembly, and any frictional resistance to its movement which might be present. Under these circumstances, the spring arrangements for lifting the trap door were required to be relatively heavy and cumbersome.

It is a main object of the invention to provide a lighter and simpler arrangement than those heretofore provided whereby the trap door either alone or the trap door and connected movable step assembly may be readily and surely operated.

This object is in large part attained by the provision of a relatively light flap or other member mounted on the trap door adjacent its free edge, this flap being in position for engagement by the usual latch for holding the trap door closed, but being normally biased to move to a position in which at least a part thereof is raised above the plane of the door a distance sufficient to enable the operator to manually start the trap door or, where the trap door is connected to the movable step assembly, the connected ensemble, to the open position.

This and other objects and advantages and the manner in which they are attained will become more fully apparent from the following detailed description when read in connection with the drawings forming a part of this specification.

In the drawings:

Fig. 1 is a more or less diagrammatic fragmentary side elevational view of a rail car body embodying the invention, the view showing the step well region with the step well and the door above the step well closed;

Fig. 2 is a similar view, with the side door and

2 step well open, certain of the parts being broken away and shown in vertical longitudinal section;

Fig. 3 is a fragmentary transverse vertical sectional view through the step well taken substantially on the line 3—3 of Figs. 1 and 5;

Fig. 4 is a fragmentary transverse vertical sectional view taken substantially along the line 4—4 as indicated on Figs. 2 and 6;

Fig. 5 is a fragmentary horizontal sectional view taken substantially along the line 5—5 of Figs. 1 and 3;

Fig. 6 is a similar horizontal sectional view taken substantially along the line 6—6 of Fig. 4;

Figs. 7 and 8 are detail sectional views on an enlarged scale, taken substantially along the line 7—7 of Fig. 5, the two figures showing the flap of the invention, respectively, in the locked position and in the unlocked position.

Fig. 9 is a detail sectional view taken substantially along the line 9—9 of Fig. 7 showing the flap mounting; and Fig. 10 is a detail sectional view taken substantially on the line 10—10 of Fig. 8.

In the drawings the invention is shown applied to a rail car body having a side wall 10 extending below the floor and vestibule platform, indicated at 11, and forming below the floor level an inturned skirt portion 12. The vestibule leading to the side door opening 13 in the side wall 10 is flanked by the transversely extending vertical walls 14 and 15 extending inwardly, respectively, from the vertical side wall posts 16 and 17 forming the sides of the doorway opening 13.

The upper portion of the doorway opening, above the platform 11 is normally closed, as usual, by a door 18, hinged as at 19, to swing about a vertical axis over the platform 11 to its open position along the wall 14, in which position it is held by a suitable latch, not shown.

As shown in Figs. 5 and 6, the doorway opening 13 is preferably somewhat narrower than the vestibule formed by the spaced transverse walls 14 and 15, and the step well, indicated generally by the numeral 20, is similarly narrowed, leaving narrow fixed portions of the platform, designated 11a and 11b between it and the respective walls 14 and 15.

The step well is flanked by the transverse walls 21 and 22, Fig. 2, and, in the instant case, comprises a fixed step 23 and a movable step assembly 24. The movable step assembly, when open, as shown in Figs. 2, 4 and 6, provides an additional step cooperating with the fixed step 23, and, when closed, as shown in Figs. 1 and 3, it closes the bottom of the doorway opening 13 below the door 18 and conforms in its outer surface to the contour of the skirt portion 12 of the body side wall 10.

The movable step assembly is pivoted on a horizontal axis, at 25, in suitable brackets provided on the side walls 21 and 22 of the step well below the fixed step 23. It is connected in the present instance, for movement with the trap door, as 26, which normally closes the top of the step well. This connection may comprise a rigid fixed length strut 27 connected to the step assembly 24 at some distance from its pivot 25 through a pivotal connection 28 which is free enough to permit slight universal movement. From the connection 28 the strut extends through an opening 29 in the fixed step 23 to a similar pivotal connection 30 with the trap door. The strut 27 may be adjusted in length and locked in adjusted position to insure the proper relation between the trap door and the movable step assembly when the structure is assembled or whenever desired.

The trap door 26 is hinged at 31 along one lateral margin of the step well to the fixed platform portion 11a and may be swung about its hinged connection. After the trap door 26 has been moved to its open position shown in Figs. 2, 4 and 6, in which it flanks the door 18, it is locked in the open position by a usual latch, as 32, provided on the door 18.

To provide for the easy opening of the trap door without the employment of heavy and cumbersome spring arrangements, the present invention provides a movable flap or other element, as 33, which is shown pivoted at 34 adjacent the free edge of the trap door opposite its hinged connection 31 and extends some distance beyond the adjacent edge of the door.

This flap 33, when the door 26 is closed, provides the means for holding it closed, being engaged by the usual latch, as 35, mounted on the platform portion 11b. The flap 33 is, however, continuously biased to swing about its pivot 34 to a raised position, shown in Fig. 8, in which it projects at an angle above the plane of the trap door 26. The biasing action is obtained, as shown, by a small coil spring 36, coiled about the pivot pin 34 and bearing at its opposite ends, as clearly shown in Figs. 7, 8, 9 and 10, against the trap door and flap, respectively.

As clearly shown in Figs. 8 and 10, lateral abutments, as 37, are provided on the flap 33 which engage the under side of the trap door 26 and limit the upward swinging movement, with respect to the door, of the flap under the action of the spring 36, to the position shown in Fig. 8. Similarly abutments, as 38, on the flap engage the outer face of the door to limit swing movement of the flap against the action of the spring beyond that of the locked position of the door, shown in Fig. 7.

This member or flap 33 provides simple and convenient means for starting the trap door from closed to open position. After the flap 33, and consequently the trap door 26 has been released by the latch 35, which is shown to be the type which may be released by the foot of the operator, the flap immediately rises under the action of its spring 36 to the position shown in Fig. 8. The operator can then lift the trap door by taking hold of the flap as a handle, or without stooping to take hold with his hand, he can, by engaging under the flap with the toe of his foot, lift the trap door until he can conveniently reach it with his hand to move it to its full open position.

In the movement of the trap door to its full open position the free edge of the flap engages door 18 and the flap is swung, against the tension of its spring 36, toward the plane of the door until the latch 32 engages the edge of the door in well known manner to lock it in open position. As soon as the latch 32 is released for closing the trap door, the spring 36 exerts pressure through the flap 33 upon the face of the door 18 to start the trap door toward closed position. The operator can then readily take hold and manually close the door, either by his hand or his foot, and finally press down the flap with his foot from the position shown in Fig. 8 to the down position of Fig. 7, where it will be automatically engaged by the usual latch 35 to lock it and the trap door down. In the foregoing description of the operation, it will be understood that, where the step assembly is linked to the trap door by a fixed length, as shown, the step assembly will be moved to open and closed positions simultaneously with the corresponding movements of the trap door.

The invention is especially desirable in this combination because of the greater mass to be moved, but it can be used to advantage also in cases where no movable step assembly is linked to the trap door.

While a specific embodiment of the invention has been herein described, it will be understood that changes and modifications may be made by those skilled in the art without departing from the main features of the invention, and such changes and modifications are intended to be covered in the appended claims.

What is claimed is:

1. A trap door and step arrangement for vehicle bodies comprising a platform, a step well beneath the level of said platform, a trap door hinged at one side of and adapted to cover the step well, a step assembly pivotally mounted in said step well, means connecting the step assembly and trap door for simultaneous opening and closing movements, respectively, and a member adapted to be engaged by a latch to hold the door closed and normally biased when released from the latch to a position spaced from the plane of said door where it serves as means for raising the trap door.

2. A trap door and step arrangement for vehicle bodies comprising a platform, a step well beneath the level of said platform, a trap door hinged at one side of and adapted to cover the step well, means connecting the step assembly and trap door for simultaneous opening and closing movements, respectively, a latch for holding said trap door closed, a member movably mounted adjacent one of the free margins of the door and engaged by the latch to hold the door closed, said member being biased to project above the plane of the door when the latch is released.

3. A trap door and step arrangement for vehicle bodies comprising a platform, a step well beneath the level of said platform, a trap door hinged at one side of and adapted, when closed, to cover said step well, a step assembly pivotally mounted in said step well, means connecting the step assembly and trap door for simultaneous opening and closing movements, respectively, a member mounted adjacent a free edge of the trap door and having a free end extending over the adjacent portion of the platform, means for locking said member to the platform when the door is in closed position, said member being biased, when released by said locking means, to a raised position in which its free end is lifted above the level of the platform.

4. A trap door and step arrangement for vehicle bodies comprising a platform, a step well beneath the level of the platform, a trap door hinged at one side of and adapted to cover the step well, a latch for holding said trap door closed, a member movably mounted adjacent one of the free margins of the trap door and engaged by the latch to hold the door closed, said member being biased to project above the plane of the door when the latch is released.

5. A trap door and step arrangement for vehicle bodies, comprising a platform, a step well beneath the level of the platform, a trap door hinged at one side of and adapted to cover the step well, a vertical wall member adjacent to and, at least in the open position of the trap door, generally paralleling the hinged side of the latter, a latch for locking the trap door to said wall member when the door is in open position flanking said wall member, and means on the door resiliently reacting against said vertical wall member to start the trap door to closed position when released by said latch.

6. A trap door and step arrangement according to claim 5 in which said means is in position for engagement by a second latch mounted on the platform for locking the trap door in closed position, and includes a member yieldingly biased upwardly of the plane of the door, whereby when released by said second latch, the member serves as a handle for opening the trap door.

7. In a trap door arrangement especially for vehicle bodies, a trap door hinged at one side to a floor or platform, a member movably mounted on the trap door adjacent one of the free margins thereof, said member being biased to project above the plane of the door, and releasable means for holding said member generally in the plane of the trap door, said member when in the projecting position constituting a grip permitting the lifting of the door by a hand or a foot of a person.

8. A trap door arrangement according to claim 7, said releasable means for holding said member being simultaneously adapted for locking said trap door in closed position to said floor or platform.

ALBERT G. DEAN.

REFERENCES CITED

The following references are of record in the file of this patent:

UNITED STATES PATENTS

| Number | Name | Date |
| --- | --- | --- |
| 1,214,756 | Chaffee | Feb. 6, 1917 |